(No Model.) 2 Sheets—Sheet 1.
G. M. STERNBERG.
ELECTRO MAGNETIC REGULATOR FOR DAMPERS AND VALVES.
No. 355,893. Patented Jan. 11, 1887.
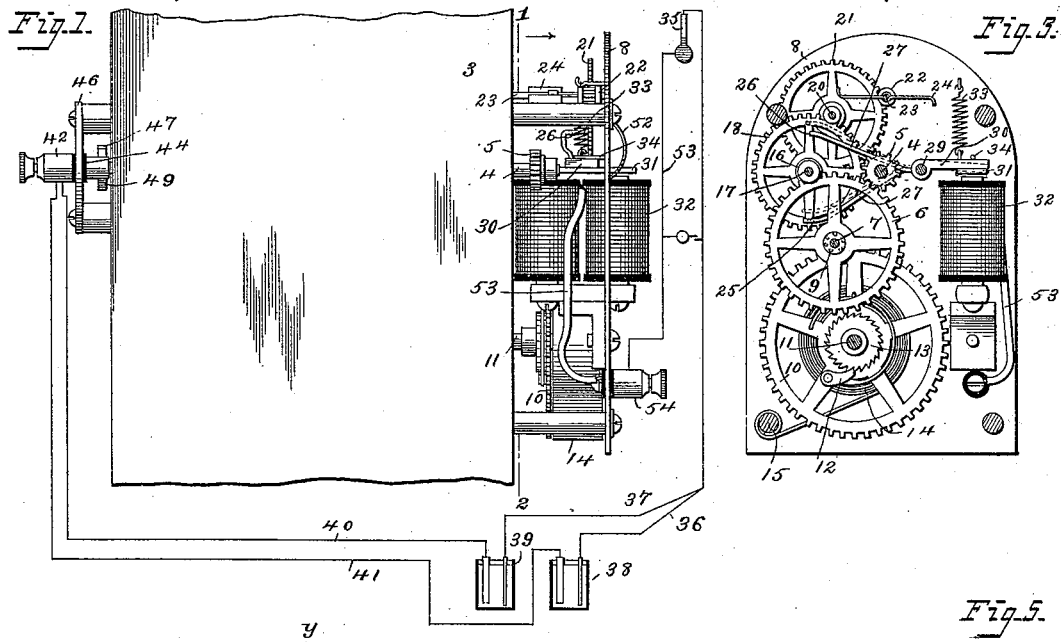
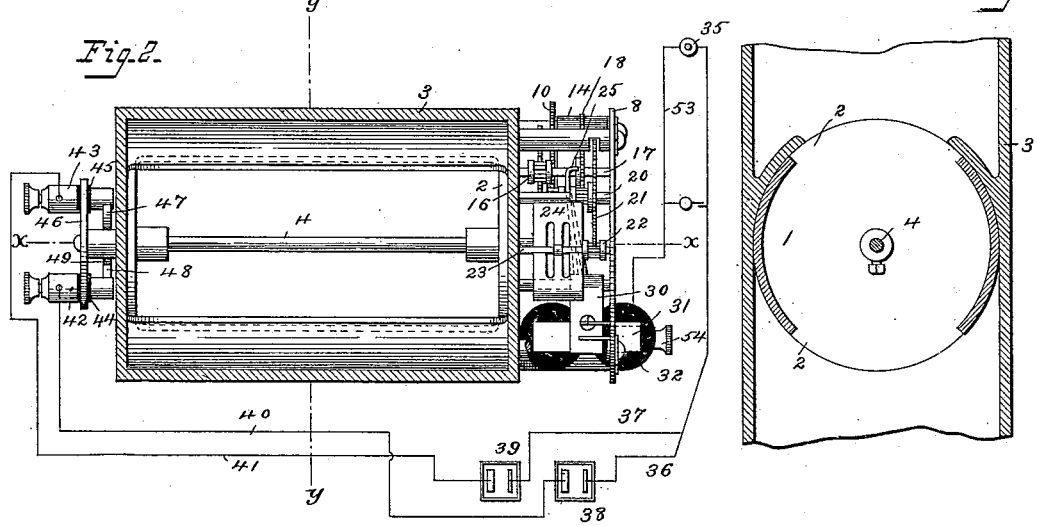
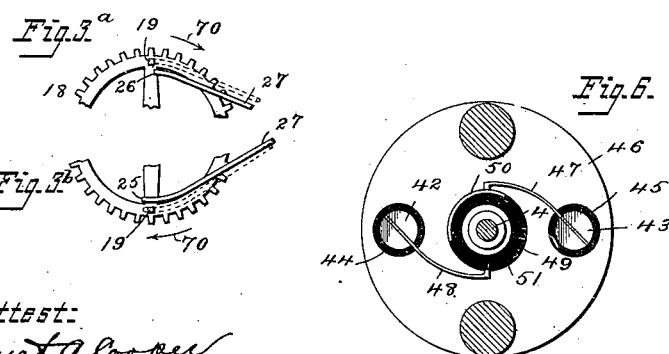
Attest:
Cour. A. Cooper
Wm. A. Harries
Geo. M. Sternberg
Inventor by
Foster & Freeman
att'ys (No Model.) 2 Sheets—Sheet 2.
G. M. STERNBERG.
ELECTRO MAGNETIC REGULATOR FOR DAMPERS AND VALVES.
No. 355,893. Patented Jan. 11, 1887.
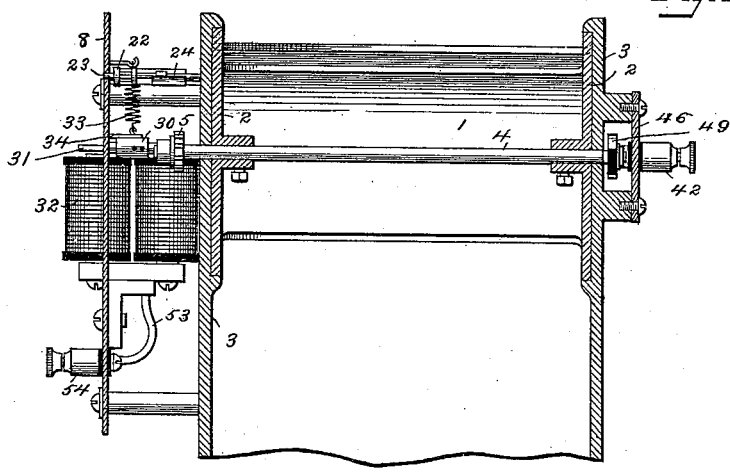
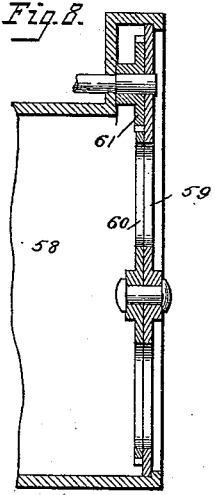
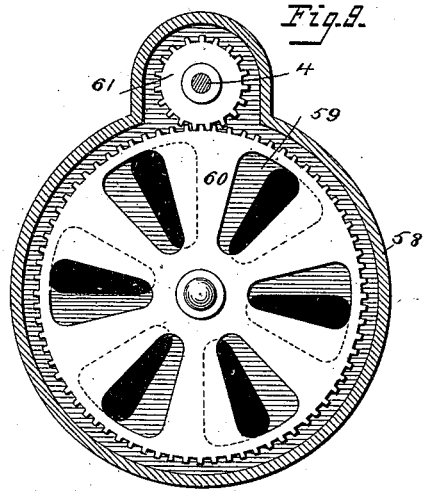
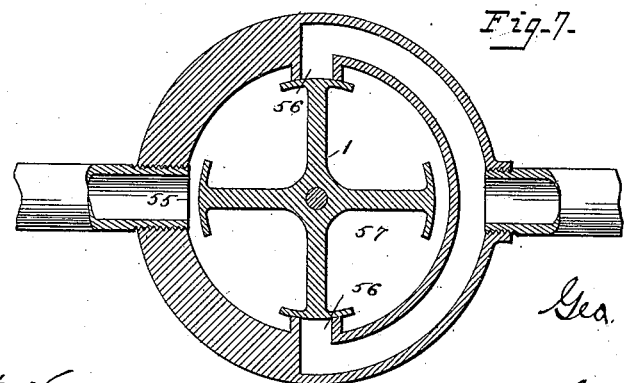
Attest:
Court A. Cooper
Wm A. Harries
Geo. M. Sternberg
Inventor by
Foster & Freeman
Attys

UNITED STATES PATENT OFFICE.

GEORGE M. STERNBERG, OF THE UNITED STATES ARMY.

ELECTRO-MAGNETIC REGULATOR FOR DAMPERS AND VALVES.

SPECIFICATION forming part of Letters Patent No. 355,893, dated January 11, 1887.

Application filed August 17, 1886. Serial No. 211,161. (No model.)

*To all whom it may concern:*

Be it known that I, GEORGE M. STERNBERG, of the United States Army, a citizen of the United States, residing temporarily at Baltimore, in the State of Maryland, have invented certain new and useful Improvements in Electro-Magnetic Regulators for Dampers and Valves, of which the following is a specification.

My invention relates in general to automatic valve or damper regulators, and in particular to devices of the class named, wherein the "closing" or "breaking" of an electric circuit operates to set mechanism in motion whereby a valve or damper is opened to or closed against the passage of a fluid therethrough.

To these ends the invention contemplates the provision, first, of a peculiarly-constructed valve or damper of that class known to the art by the term "balanced valves," and in so connecting said valve or damper with a fluid service-pipe, that but a slight degree of power is required to operate said valve to control the passage of fluid; second, of valve-operating mechanism adapted to operate a valve or damper in a predetermined direction, and in mechanism to check the movement of said valve to close or open a passage therethrough to a fluid; third, of two or more galvanic batteries in connection with the valve-operating mechanism, and in mechanism to cause said batteries to alternately set in motion or check the valve-actuating mechanism; and, finally, the construction, arrangement, and combination of the several elements comprised in the device for service, substantially as hereinafter specifically set forth, and illustrated in the accompanying drawings, in which similar figures of reference denote similar parts.

In the drawings, Figures 1 and 2 represent, respectively, a side elevation and a top plan view of a valve and connected valve-operating mechanism constructed in accordance with my invention. Fig. 3 is a sectional view, taken on the line 1 2, showing the mechanism by which the valve is opened and closed. Figs. 3ª and 3ᵇ are detached detail views of parts of the operating mechanism. Fig. 4 is a longitudinal sectional view taken on the line $x$ $x$ of Fig. 2. Fig. 5 is a transverse section taken on the line $y$ $y$ of Fig. 2. Fig. 6 is a detached detail view of the commutator. Figs. 7, 8, and 9 illustrate transverse sectional views of different valves adapted to be operated by my invention.

In the present embodiment of my invention I have shown a valve or damper arranged within the delivery-pipe of a heater or furnace, and adapted to be opened or closed to or against the passage of heated air by mechanism which is set in motion by the alternate closing or breaking of an electric circuit through the medium of a thermostat or thermostats which are located in the apartment or apartments with which said delivery-pipe connects, and wherein it is desired to maintain a predetermined degree of temperature.

To this end I arrange a cylindrical valve, 1, having its periphery provided with cut-away portions 2, (herein shown as two, but which, if desired, may exceed that number,) within the delivery-pipe 3 of a heating system upon a rotatable shaft, 4, which extends at its opposite ends through the sides of said delivery-pipe, and is provided at one of said ends with a gear-pinion, 5, which is engaged by a spur-gear wheel, 6, mounted upon a shaft, 7, having bearings at its opposite ends in the side of said pipe 3, and a plate or frame, 8, supported thereby, as are also the several shafts of the operating mechanism. To said shaft 7, at one side of the wheel 6 thereon, I secure a lantern-wheel, 9, (shown by dotted lines in Fig. 3,) which is engaged by a spur-gear wheel, 10, loosely mounted upon a shaft, 11, and provided upon one side with a spring-pressed pawl, 12, which engages a ratchet-wheel, 13, secured to said shaft 11. The main or actuating spring 14 is connected at one end to said shaft 11 and at the opposite end to one of the studs 15, which supports the plate or frame 8, as hereinbefore stated. Tension is imparted to said spring 14 by a key or wrench, which is applied to the projecting squared end of the shaft 11 in the ordinary manner.

I set the described operating mechanism into motion, and control the same by the following means, to wit: A lantern-wheel, 16, which engages the teeth of the spur-wheel 6, is mounted upon a shaft, 17, upon which is also mounted a spur-gear wheel, 18, (shown herein as provided upon one side with a single projecting spur, 19,) but which may be provided with more than one when desired, which spur or spurs, in connection with mechanism presently to be described, operates to check the movements of the operating mechanism. The teeth of the wheel 18 engage a lantern-wheel secured upon a shaft, 20, beside a spur-wheel, 21, which in turn engages a lantern-wheel, 22, secured to a shaft, 23, which carries a flier or movement-regulating fan, 24.

As before stated, the spur-wheel 18 is provided with a projecting pin or pins, 19, which are adapted to be engaged, either at the highest or lowest point of movement, by the laterally-projecting ends 25 or 26 of rock-arms 27 or 28, which project from a rock-shaft, 29, journaled in the side of the delivery-pipe 3 and plate 8, respectively. From the opposite side of said shaft 29 an arm, 30, projects, to the outer end of which is secured an armature, 31, which operates in the magnetic field of an electro-magnet, 32, and which is held, when not in contact with said magnet, by a spring, 33, at its highest limit of motion, determined by a stud, 34, that projects from the frame 8.

When the armature is elevated, it will be observed that the end 25 of the lower rock-arm, 27, will lie in the track of the projecting pin or pins 19 of the wheel 18, and will therefore hold said wheel, together with the operating mechanism and the valve controlled thereby, in stationary position, as shown by full lines in Fig. 3. When, however, the magnet 32 is energized, the downward movement of the armature 31 will release the projecting pin 19 from contact with the rock-arm 27, and at the same time move the end 26 of the upper rock-arm, 28, into position to be engaged by said projecting pin 19, as shown by dotted lines in said Fig. 3.

It will be observed that the wheel 18 makes one-half revolution to bring its projecting pin 19 into the respective positions set forth above; hence the valve 1, inasmuch as its opposite sides are cut away, as shown at 2, must make one-fourth of a full revolution to bring either of said openings 2, or the imperforate portion of the valve between said openings, in front of the port or passage in the delivery-pipe 3. It will also be understood that valves provided with a greater or a less number of openings, as shown in Figs. 7, 8, and 9, will make a less or greater portion of a full revolution than the valve shown in Fig. 5.

It will be understood that, tension having been imparted to the mainspring 14, such spring will, upon the alternate engagement with and release of the projecting pin 19 by the arms 27 and 28, rotate the valve in a continuous forward step-by-step motion. It will also be understood that such engagement and release of said projecting pin or pins 19 is accomplished through the successive magnetizing and demagnetizing of the electro-magnet 32. Again, it will be understood that the elements of a galvanic battery, when said battery is in constant use, will be liable to become so weakened as to render said battery inoperative. I therefore provide that the magnet 32 may be successively energized by two or more separate batteries, and that the circuit between said magnet and batteries may be closed and broken automatically. To this end I connect one end of a thermostat, 35, which is placed within the desired apartment by conducting-wires 36 and 37, with, in the present instance, one of the poles of each of two batteries, 38 and 39, the remaining poles of which are connected by conductors 40 and 41 with binding-posts 42 and 43, which are respectively secured in insulated sockets 44 and 45, fixed in a plate, 46, which is secured by suitable supports to the side of the delivery box or pipe 3, preferably opposite that whereon the valve-operating mechanism is placed. Brushes or contact-springs 47 and 48 extend from the posts 42 and 43, and bear upon a commutator, 49, which is secured upon the end of the shaft 4, and is provided with the usual circuit closing and breaking plates, 50 and 51, so arranged with reference to the brushes 47 and 48 as to close the circuit alternately through the posts 42 and 43 and the batteries 38 and 39.

From the commutator 49 the current passes through the shaft 4 to the plate 8, thence by a conductor, 52, to the magnet 32, and thence by a conductor, 53, to and through the binding-post 54 to the thermostat 35, to which it is connected in the ordinary manner.

Although but two contact-brushes, 47 and 48, are herein shown and described, it will be understood that a greater number of brushes may be employed, as when valves like those illustrated in Figs. 7, 8, and 9 are used, and that said brushes may each be in circuit with a battery separate from the remaining batteries of the system.

From the foregoing description the operation of the device is obvious, it being understood that any increase in the temperature of the apartment wherein the thermostat is located above a predetermined point will operate through said thermostat to close the circuit through the magnet 32, thereby energizing said magnet, drawing down the armature 31, and releasing the projecting pin 19 of the wheel 18 from contact with the end of the lower rock-arm, 27, and at the same time bringing the end of the upper arm, 28, in the track of said pin 19, by which the valve 1 is permitted to make but one-fourth of a full revolution, and will therefore close the passage through the delivery-pipe. When the temperature of the apartment falls below such predetermined point, the circuit through the magnet 32 will, through the medium of the thermostat, be broken, thereby releasing the pin 19 from the upper rock-arm, 28, and setting the lower arm, 27, in position to engage said stud, which permits the valve 1 to again be moved one-fourth of a full revolution, thus opening the passage to fluids therethrough.

Figs. 3ª and 3ᵇ represent the pin 19 of the wheel 18 at its highest and lowest limit of movement, respectively, and also shows by dotted lines said pin engaged by the projecting ends of the arms 27 and 27, and by full lines said pin released from said arms.

While I have herein described my improvement as applied to the hot-air delivery-pipe of a heating system, it will yet be understood that said device may be applied to the draft or cold-air box or pipe of a furnace and be controlled by a thermostat or thermostats located in one or more apartments, as desired, or to a ventilator permitting the heated air to escape from the apartment.

In Figs. 7, 8, and 9 I have shown different forms of valves adapted to be operated by the mechanism herein described. Of such forms, Fig. 7 shows a rotatable valve, 1, provided with two or more arms, which project from a central hub and are provided at their outer ends with curved plates adapted to close the outlet ports or openings 56 from the chamber 57, wherein said valve operates, as will be apparent.

In Figs. 8 and 9 I show a casing, 58, inclosing a fixed perforate disk, 59, and a rotatable perforate disk, 60, having peripheral teeth which are engaged by a pinion, 61, mounted upon the shaft 4 of my improved valve-closing device, which, it will be understood, operates to move the apertures of the disks 59 and 60 into and out of alignment, when desired, and always in one direction.

The device is also applicable for use in connection with the throttle-valves of steam or other fluid-pressure motors, in which connection, if desired, the thermostat may be replaced by any approved form of circuit closing and breaking mechanism operated either by the excess of pressure of said fluid or the increase in the speed of said motors beyond certain fixed limits.

While I have herein confined the description of my improvement wholly to its connection with valves or dampers, it will yet be apparent that the mechanism shown therein may be employed with good results in connection with many mechanical motors and movements—as, for instance, in clutch mechanism, in stop-motion for looms, &c.

If desired, a switch adapted to be operated by hand may be used with the herein-described device in lieu of a thermostat, or in connection with a thermostat, but independent thereof.

While I have herein shown and described but two batteries in connection with my device, it will yet be understood that any desired number of batteries may be employed; also that said batteries may be successively thrown into and out of circuit with the operating mechanism of said device.

I do not herein limit myself to the exact construction and arrangement of the parts comprised in my improvement as herein shown and described, as said parts may be combined in various ways to effect the result sought.

I claim—

1. A rotating valve, an actuating-spring therefor, and an electro-magnet to control the action of said spring, in combination with batteries and means, substantially as described, to throw each of said batteries into circuit with said magnet.

2. A rotatable valve, an actuating-spring therefor, and an electro-magnet to control said spring, in combination with batteries and means, substantially as described, to throw each of said batteries successively into circuit with said magnet, as and for the purpose specified.

3. A rotatable valve, an actuating-spring therefor, an electro-magnet to control said spring, and a thermostat in electric connection with said magnet, in combination with batteries and means to throw each of said batteries successively into circuit with said magnet, as and for the purpose set forth.

4. A rotatable valve, an actuating-spring therefor, and gear-connections between said spring and valve, in combination with an electro-magnet, a thermostat in electric connection therewith, batteries connected with said magnet and thermostat, and means, substantially as described, to throw each of said batteries successively into circuit with said magnet, as and for the purpose specified.

5. A rotatable valve, an actuating-spring therefor, and gear-connections between said spring and valve, in combination with an electro-magnet, a thermostat, a commutator, and batteries adapted to be successively thrown into and out of circuit with said magnet, substantially as described.

6. A rotatable valve, an actuating-spring therefor, and gear-wheels between and connecting said spring and valve, in combination with a magnet having a vibrating armature provided with projecting arms to engage a projecting pin upon one of said gear-wheels, batteries, and means to throw each of said batteries successively into circuit with said magnet, as and for the purpose specified.

7. A valve-operating mechanism having a gear-wheel provided with a projecting pin, in combination with vibrating arms operated by an electro-magnet, and adapted to be alternately moved into the path of said pin to limit the rotation of said gear-wheel when said magnet is magnetized or demagnetized, substantially as described.

8. A valve-operating mechanism having a gear-wheel provided with a projecting pin, 19, in combination with vibrating arms 27 and 27, secured to an armature operated by an electro-magnet, and adapted to be alternately moved into the path of said pin 19, when said magnet is magnetized or demagnetized, and means, substantially as described, to throw said magnet into circuit with a battery, as and for the purpose specified.

9. A valve, a rotatable shaft therefor, an actuating-spring connected to said shaft, and an electro-magnet to control said spring, in combination with batteries, a thermostat and a commutator to throw each of said batteries successively into circuit with said electro-magnet, substantially as described.

10. A rotatable valve, its shaft and actuating mechanism, in combination with a commutator secured to said shaft, contact springs or brushes to engage said commutator, electro-magnet to control the valve-actuating mechanism, batteries, and means, substantially as described, to throw each of said batteries into circuit with said electro-magnet, as and for the purpose specified.

In testimony whereof I have signed my name to this specification in the presence of two subscribing witnesses.

GEORGE M. STERNBERG.

Witnesses:
WM. A. HARRIES,
WM. H. H. KNIGHT.